(12) United States Patent
Hanzawa

(10) Patent No.: US 10,547,806 B2
(45) Date of Patent: Jan. 28, 2020

(54) SOLID-STATE IMAGING ELEMENT, METHOD FOR OPERATING SOLID-STATE IMAGING ELEMENT, IMAGING DEVICE, AND ELECTRONIC EQUIPMENT

(71) Applicant: SONY CORPORATION, Tokyo (JP)

(72) Inventor: Katsuhiko Hanzawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/092,051

(22) PCT Filed: Mar. 31, 2017

(86) PCT No.: PCT/JP2017/013507
§ 371 (c)(1),
(2) Date: Oct. 8, 2018

(87) PCT Pub. No.: WO2017/179442
PCT Pub. Date: Oct. 19, 2017

(65) Prior Publication Data
US 2019/0116325 A1 Apr. 18, 2019

(30) Foreign Application Priority Data

Apr. 14, 2016 (JP) .................................. 2016-081033

(51) Int. Cl.
*H04N 5/376* (2011.01)
*H04N 5/341* (2011.01)
(Continued)

(52) U.S. Cl.
CPC ........... *H04N 5/3765* (2013.01); *H04N 5/341* (2013.01); *H04N 5/347* (2013.01); *H04N 5/3698* (2013.01); *H04N 5/3741* (2013.01)

(58) Field of Classification Search
CPC ...... H04N 5/341; H04N 5/3698; H04N 5/374; H04N 5/3741; H04N 5/3765
See application file for complete search history.

(56) References Cited

U.S. PATENT DOCUMENTS

| | | | | | |
|---|---|---|---|---|---|
| 5,907,357 A | * | 5/1999 | Maki | ...................... | G11C 27/04 348/241 |
| 6,674,471 B1 | * | 1/2004 | Masuyama | ....... | H01L 27/14609 257/223 |

(Continued)

FOREIGN PATENT DOCUMENTS

| JP | 2014-050019 A | 3/2014 |
|---|---|---|
| JP | 2015-211259 A | 11/2015 |

(Continued)

OTHER PUBLICATIONS

International Search Report and Written Opinion of PCT Application No. PCT/JP2017/013507, dated Jun. 13, 2017, 6 pages of ISRWO.

*Primary Examiner* — Daniel M Pasiewicz
(74) *Attorney, Agent, or Firm* — Chip Law Group

(57) ABSTRACT

The present disclosure relates to a solid-state imaging element with which electric power consumption can be reduced, a method for operating the solid-state imaging element, an imaging device, and electronic equipment. After a signal output is outputted from a driver in an Nth row according to a selection signal from a vertical scanning unit, switchover is performed to transmit a signal output from a driver in an (N+1) row. Before the switchover, the drivers in the Nth and (N+1)th rows are brought into a floating state, and control signal lines to which the signal outputs from the drivers are transmitted are short-circuited for charge dispersion. This increases a potential of the control signal line of the next (N+1)th row to an intermediate potential. Thereafter, the driver in the (N+1)th row outputs the signal output. With this, the driver in the (N+1) row only needs to increase the potential from the intermediate potential to Hi level. This can reduce electric power consumption. The present disclosure is applicable to solid-state imaging elements.

14 Claims, 13 Drawing Sheets

(51) Int. Cl.
*H04N 5/369* (2011.01)
*H04N 5/374* (2011.01)
*H04N 5/347* (2011.01)

(56) References Cited

U.S. PATENT DOCUMENTS

| | | | | |
|---|---|---|---|---|
| 8,462,245 B2* | 6/2013 | Kwon | ................... | H04N 5/365 |
| | | | | 250/208.1 |
| 2009/0160990 A1* | 6/2009 | Johnson | ............... | H04N 5/3532 |
| | | | | 348/308 |
| 2014/0063308 A1 | 3/2014 | Saito | | |

FOREIGN PATENT DOCUMENTS

| | | |
|---|---|---|
| KR | 10-2017-0008732 A | 1/2017 |
| WO | 2015/163170 A1 | 10/2015 |
| WO | 2015/182390 A1 | 12/2015 |

* cited by examiner

SOLID-STATE IMAGING ELEMENT, METHOD FOR OPERATING SOLID-STATE IMAGING ELEMENT, IMAGING DEVICE, AND ELECTRONIC EQUIPMENT

CROSS REFERENCE TO RELATED APPLICATIONS

This application is a U.S. National Phase of International Patent Application No. PCT/JP2017/013507 filed on Mar. 31, 2017, which claims priority benefit of Japanese Patent Application No. JP 2016-081033 filed in the Japan Patent Office on Apr. 14, 2016. Each of the above-referenced applications is hereby incorporated herein by reference in its entirety.

TECHNICAL FIELD

The present disclosure relates to a solid-state imaging element, a method for operating the solid-state imaging element, an imaging device, and electronic equipment, specifically to a solid-state imaging element with which electric power consumption can be reduced, a method for operating the solid-state imaging element, an imaging device, and electronic equipment.

BACKGROUND ART

Recently, a solid-state imaging element is mounted in a wide variety of devices such as imaging devices and mobile terminals.

However, capacities of batteries included in the devices such as the imaging devices and the mobile terminals are limited. Thus, a technology for reducing electric power consumption of the solid-state imaging element has been required.

In order to address this, there has been known a technique for reducing pixel loads in drive operation performed, by the solid-state imaging element, on a single row or a plurality of rows each time, for the purpose of increasing the speed and to reduce the electric power consumption (see Patent Literature 1).

CITATION LIST

Patent Document

Patent Document 1: Japanese Patent Application Laid-Open No. 2014-050019

SUMMARY OF THE INVENTION

Problems to be Solved by the Invention

However, according to the technology of Patent Literature 1, the reduction in the pixel loads is limited, and consequently the increase in the speed and the reduction in the electric power consumption are also limited.

The present disclosure was made in view of the circumstances above. Especially, the present disclosure is to achieve a reduction in electric power consumption without depending on the reduction in the pixel loads.

Solutions to Problems

A solid-state imaging element according to a first aspect of the present disclosure is a solid-state imaging element including: a driver configured to output, with respect to a respective row of a pixel array, a control signal for causing a pixel signal to be transferred in a vertical direction; a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state.

The driver may be configured to output a control signal to the control signal line of the Nth row and then output the control signal to the control signal line of the Mth row, each of the control signals causing the pixel signal to be transferred in the vertical direction, and, during a predetermined period including a timing at which the control signal of the Nth row is switched over to the control signal of the Mth row, the short-circuit setting unit may be configured to set, among the control signal lines for causing the respective control signals to be transmitted with respect to the respective rows of the pixel array, the control signal line of the Nth row and the control signal line of the Mth row to the short-circuited state.

The Mth row may be an (N+1)th row, the driver may be configured to output the control signal to the control signal line of the Nth row and then output the control signal to a control signal line of the (N+1)th row, each of the control signals causing the pixel signal to be transferred in the vertical direction, and, during a predetermined period including a timing at which the control signal of the Nth row is switched over to the control signal of the (N+1)th row, the short-circuit setting unit may be configured to set, among the control signal lines for causing the respective control signals to be transmitted with respect to the respective rows of the pixel array, the control signal line of the Nth row and the control signal line of the (N+1)th row to the short-circuited state.

During a period in which the floating setting unit sets an output of the driver of the control signal line of the (N+1)th row to the floating state, the short-circuit setting unit may be configured to set, among the control signal lines for causing the respective control signals to be transmitted with respect to the respective rows of the pixel array, the control signal line of the Nth row and the control signal line of the (N+1)th row to the short-circuited state.

The floating setting unit may be a switch for performing switchover to select whether or not to bring the output of the driver into the floating state, and the short-circuit setting unit may be a switch for performing switchover to select whether or not to bring, among the control signal lines for causing the respective control signals to be transmitted with respect to the respective rows of the pixel array, the control signal line of the Nth row and the control signal line of the Mth row to the short-circuited state.

The driver may include the floating setting unit to set to any of states of, a first state in which the output of the driver is not in the floating state and the control signal for causing the pixel signal to be transferred in the vertical direction is outputted, a second state in which the control signal is not outputted, and a third state in which the output of the driver is in the floating state.

The floating setting unit and the short-circuit setting unit may be provided on a pixel chip.

The floating setting unit and the short-circuit setting unit may be provided on a circuit chip.

The floating setting unit and the short-circuit setting unit may be dispersedly provided on a pixel chip and a circuit chip.

An imaging device according to the first aspect of the present disclosure is an imaging device including: a driver configured to output, with respect to a respective row of a pixel array, a control signal for causing a pixel signal to be transferred in a vertical direction; a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state.

Electronic equipment according to a first aspect of the present disclosure is electronic equipment including: a driver configured to output, with respect to a respective row of a pixel array, a control signal for causing a pixel signal to be transferred in a vertical direction; a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state.

According to the first aspect of the present disclosure, a control signal for causing a pixel signal to be transferred in a vertical direction is outputted with respect to a respective row of a pixel array by a driver, an output of the driver is set to a floating state by a floating setting unit, and, among control signal lines for causing respective control signals to be transmitted with respect to respective rows of the pixel array, a control signal line of an Nth row and a control signal line of an Mth row are set to a short-circuited state by a short-circuit setting unit.

A method according to a second aspect of the present disclosure for operating a solid-state imaging element is a method for operating a solid-state imaging element that includes a driver configured to output, with respect to a respective row of a pixel array, a control signal for causing a pixel signal to be transferred in a vertical direction, a floating setting unit configured to set an output of the driver to a floating state, and a short-circuit setting unit configured to set, among control signal lines for causing respective control signals to be transmitted with respect to respective rows of the pixel array, a control signal line of an Nth row and a control signal line of an Mth row to a short-circuited state, the method including: outputting, by the driver, a control signal to the control signal line of the Nth row and then outputting, by the driver, a control signal to the control signal line of the Mth row, each of the control signals causing the pixel signal to be transferred in the vertical direction; and, during a predetermined period including a timing at which the control signal of the Nth row is switched over to the control signal of the Mth row, setting, by the short-circuit setting unit, among the control signal lines for causing the respective control signals to be transmitted with respect to the respective rows of the pixel array, the control signal line of the Nth row and the control signal line of the Mth row to the short-circuited state.

The Mth row may be an (N+1)th row, the driver may be configured to output the control signal to the control signal line of the Nth row and then output the control signal to a control signal line of the (N+1)th row, each of the control signals causing the pixel signal to be transferred in the vertical direction, and, during a predetermined period including a timing at which the control signal of the Nth row is switched over to the control signal of the (N+1)th row, the short-circuit setting unit may be configured to set, among the control signal lines for causing the respective control signals to be transmitted with respect to the respective rows of the pixel array, the control signal line of the Nth row and the control signal line of the (N+1)th row to the short-circuited state.

During a period in which the floating setting unit sets an output of the driver of the control signal line of the (N+1)th row to the floating state, the short-circuit setting unit may be configured to set, among the control signal lines for causing the respective control signals to be transmitted with respect to the respective rows of the pixel array, the control signal line of the Nth row and the control signal line of the (N+1)th row to the short-circuited state.

According to the second aspect of the present disclosure, a control signal for causing a pixel signal to be transferred in a vertical direction is outputted with respect to a respective row of a pixel array by a driver, an output of the driver is set to a floating state by a floating setting unit, among control signal lines for causing respective control signals to be transmitted with respect to respective rows of the pixel array, a control signal line of an Nth row and a control signal line of an Mth row are set to a short-circuited state by a short-circuit setting unit, a control signal is outputted by the driver to the control signal line of the Nth row and then a control signal is outputted by the driver to the control signal line of the Mth row, each of the control signals causing the pixel signal to be transferred in the vertical direction, and, during a predetermined period including a timing at which the control signal of the Nth row is switched over to the control signal of the Mth row, among the control signal lines for causing the respective control signals to be transmitted with respect to the respective rows of the pixel array, the control signal line of the Nth row and the control signal line of the Mth row are set to the short-circuited state by the short-circuit setting unit.

Effects of the Invention

According to one aspect of the present disclosure, it is possible to achieve a reduction in electric power consumption without depending on a reduction in pixel loads.

MODE FOR CARRYING OUT THE INVENTION

With reference to the accompanying drawings, the following will describe details of preferred embodiments of the present disclosure. Note that, in the specification and the drawings of the present application, constituent elements having substantially identical functions and configurations are given identical reference signs to avoid repeated description.

<Example of Configuration of Solid-state Imaging Element According to Present Disclosure>

Figure 1:
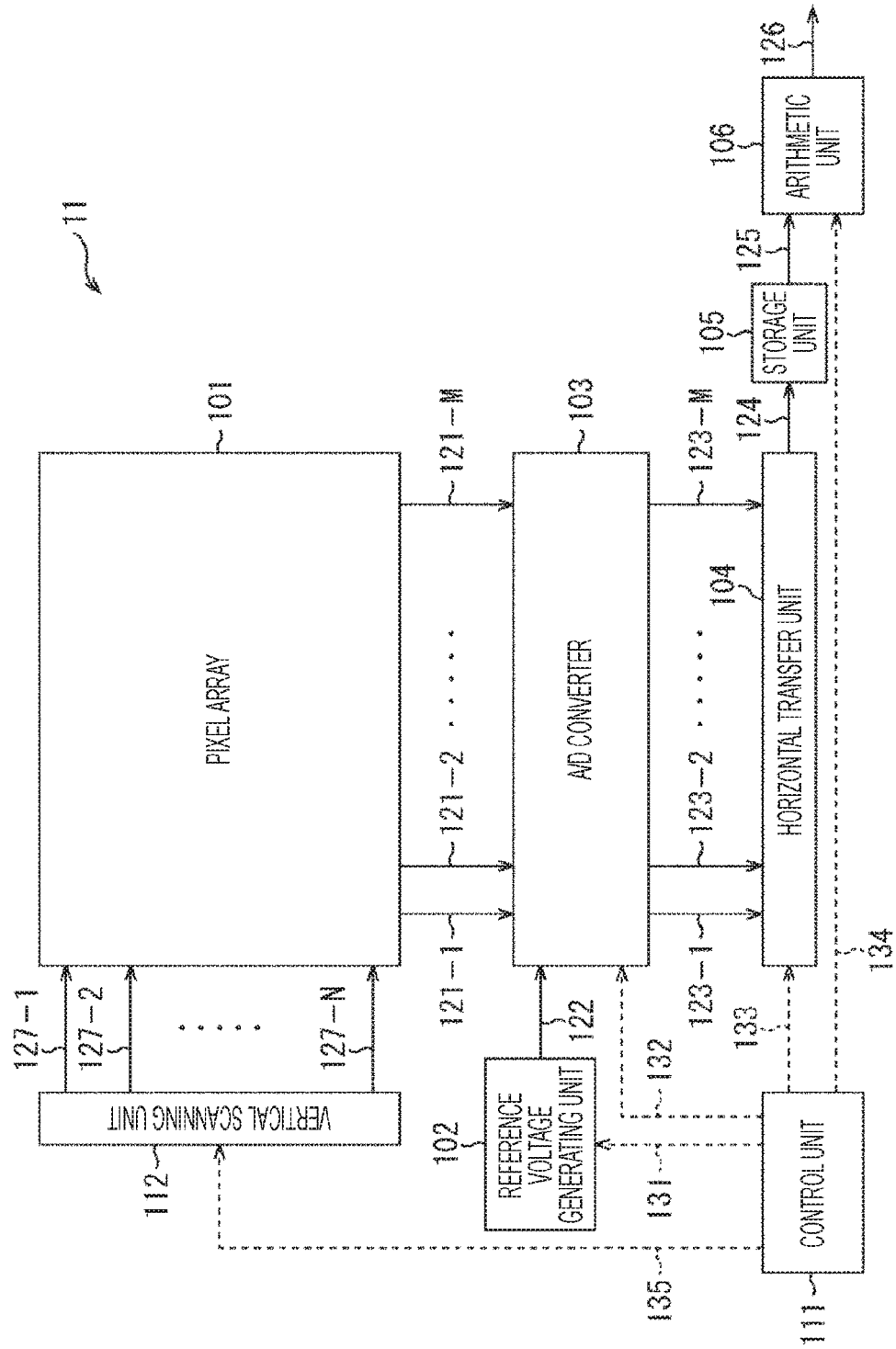
FIG. 1 is a view illustrating an example of a configuration of a solid-state imaging element according to the present disclosure.

With reference to FIG. 1, a solid-state imaging element to which the technology of the present disclosure is applied will be described.

A solid-state imaging element 11 of FIG. 1 is a device for performing photoelectric conversion on light from a subject and outputting the resultant as image data. For example, the solid-state imaging element 11 is configured as a complementary metal oxide semiconductor (CMOS) image sensor including CMOS, a charge coupled device (CCD) image sensor including CCD, or the like.

As illustrated in FIG. 1, the solid-state imaging element 11 includes a pixel array 101, a reference voltage generating unit 102, an A/D converter 103, a horizontal transfer unit 104, a storage unit 105, an arithmetic unit 106, a control unit 111, and a vertical scanning unit 112.

The pixel array 101 is a pixel region in which pixel configurations (unit pixels) each having a photoelectric conversion element such as a photodiode are arranged in the shape of a flat surface or a curved surface.

The reference voltage generating unit 102 generates a reference signal (also referred to as a reference voltage) Ramp 122 that serves as a standard signal used in A/D conversion that is performed by the analog/digital (A/D) converter 103. As illustrated in FIG. 1, the reference voltage generating unit 102 generates a plurality of reference voltages Ramp 122 having different potentials, and supplies the reference voltages Ramp 122 to the A/D converter 103.

The A/D converter 103 performs A/D conversion on signals, such as analog signals, read from the respective unit pixels in the pixel array 101 via vertical signal lines 121-1 to 121-N to yield digital data, and outputs the digital data to the horizontal transfer unit 104 via vertical signal lines 123-1 to 123-N.

The horizontal transfer unit 104 causes the digital data supplied from the A/D converter 103 to be stored in the storage unit 105 via a transmission line 124, and then sequentially transfers the digital data to the arithmetic unit 106 via a transmission line 125.

With use of the digital data supplied from the horizontal transfer unit 104, the arithmetic unit 106 performs an arithmetic operation to correct the result of the A/D conversion performed by the A/D converter 103. The arithmetic unit 106 outputs data of the corrected result of the A/D conversion to, e.g., the outside of the solid-state imaging element 11 via a transmission line 126.

The control unit 111 controls the reference voltage generating unit 102, the A/D converter 103, the horizontal transfer unit 104, the arithmetic unit 106, and the vertical scanning unit 112 by supplying control signals thereto via control signal lines 131 to 135. Thus, the control unit 111 controls operation of the whole of the solid-state imaging element 11 (i.e., operation of each unit).

Under control of the control unit 111, the vertical scanning unit 112 supplies control signals to transistors of the unit pixels in the pixel array 101 to control operation of the transistors.

The pixel array 101 includes the unit pixels arranged in a matrix (in an array) of N row(s) and M column(s) (each of N and M is an arbitrary natural number).

In addition, the pixel array 101 includes the vertical signal lines 121-1 to 121-M and control lines 127-1 to 127-N. In a case where discrimination between the vertical signal lines 121-1 to 121-M is not necessary for explanation, the vertical signal lines 121-1 to 121-M will be referred to as vertical signal lines 121. In a case where discrimination between the control lines 127-1 to 127-N is not necessary for explanation, the control lines 127-1 to 127-N will be referred to as control lines 127. This applies to other configurations. Pixel loads included in the unit pixels are connected to the vertical signal lines 121 in the columns in which the respective pixel loads are provided, and are also connected to the control lines 127 in the rows in which the respective pixel loads are provided.

Signals read from the unit pixels are transmitted to the A/D converter 103 via the vertical signal lines 121. In addition, to the control lines 127, control signals from the vertical scanning unit 112 for the respective unit pixels (in the respective rows) are transmitted.

<Relation Between Vertical Scanning Unit and Pixel Array According to Conventional Technology>

Figure 2:
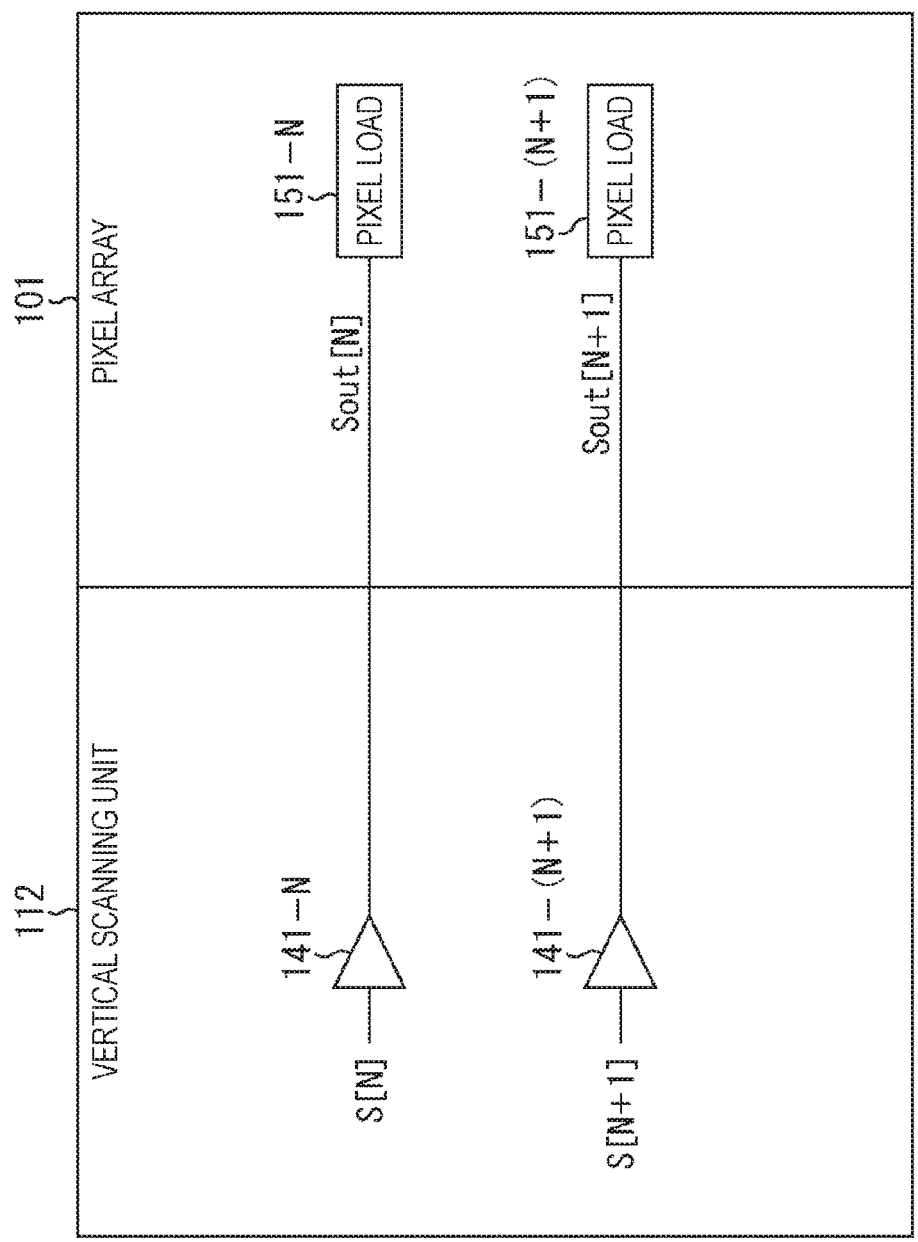
FIG. 2 is a view illustrating an example of a configuration of a vertical scanning unit and a pixel array according to a conventional technology.

Next, with reference to FIG. 2, the following will describe a relation between a vertical scanning unit 112 and pixel loads 151 in a pixel array 101 according to a conventional technology.

In a boundary between the vertical scanning unit 112 and the pixel array 101, drivers 141-1, 141-2, . . . , 141-N for outputting control signals are provided in respective rows in the vertical scanning unit 112, and pixel loads 151-1, 151-2, . . . , 151-N are provided in respective portions in the pixel array 101. According to the control signals outputted from the drivers 141, the pixel loads 151 transfer pixel signals.

Note that the vertical manipulation unit 112 and the pixel array 101 may be on a single chip, or may be on separate chips that are stacked through a technique such as a through silicon via (TSV), a microbump, and/or connection of Cu terminals (Cu—Cu pad connection).

Figure 3:
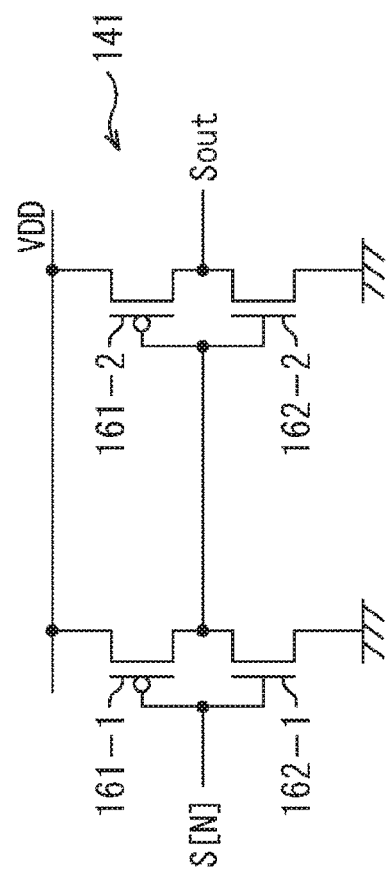
FIG. 3 is a view illustrating an example of a configuration including a driver of a vertical scanning unit according to the conventional technology.

<Example of Configuration of Driver>Next, with reference to FIG. 3, the following will describe an example of a configuration of each of the drivers 141.

As illustrated in FIG. 3, for example, the driver 141 has a so-called two-stage configuration in which sources and drains of a PMOS transistor 161-1 and an NMOS transistor 162-1, which are shown in this order from the top in FIG. 3, are connected in series between a power source VDD and a ground (ground potential), and sources and drains of a PMOS transistor 161-2 and an NMOS transistor 162-2, which are shown in this order from the top in FIG. 3, are connected in series between the power source VDD and the ground.

In addition, at both of gates of the transistors 161-1 and 162-1 in the driver 141, a selection signal S[N] for an Nth row is accepted. The signal is then inverted by the transistors 161-1 and 162-1 to yield an inversion signal corresponding to a power supply voltage VDD, and the inversion signal is outputted. Thereafter, the inversion signal is inverted again by the transistors 161-2 and 162-2 to yield an inversion signal, which is then outputted. Thus, a potential of the inversion signal is outputted as a signal output Sout[N] of the Nth row.

With such a configuration, in a case where a selection signal S[N] is at Hi level, the driver 141 operates as follows. That is, the transistor 161-1 is turned on and the transistor 162-1 is turned off, so that a signal at Low level that is a power source VDD level is outputted. In addition, the transistor 161-2 is turned on and the transistor 162-2 is turned off, so that a signal at Hi level is outputted as a signal output Sout[N].

Meanwhile, in a case where a selection signal S[N] is at Low level, the driver 141 operates as follows. That is, the transistor 161-1 is turned off and the transistor 162-1 is turned on, so that a signal at Hi level that is a ground level is outputted. In addition, the transistor 161-2 is turned off and the transistor 162-2 is turned on, so that a signal at Low level that is a ground level is outputted as a signal output Sout[N].

<Example of Configuration of Pixel Load>

Figure 4:
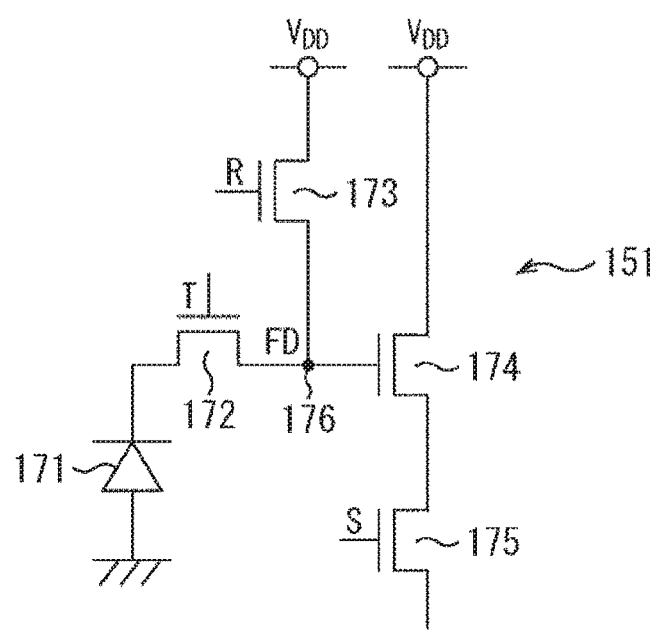
FIG. 4 is a view illustrating an example of a configuration of a pixel load according to the present disclosure.

Next, with reference to FIG. 4, the following will describe a configuration of a pixel circuit included in each of the pixel loads 151. The pixel circuit included in the pixel load 151 includes a photoelectric conversion element that is a photodiode 171, for example. In addition to the photodiode 171, the pixel circuit included in the pixel load 151 includes, for example, four transistors that are a transfer transistor (transfer gate) 172, a reset transistor 173, an amplification transistor 174, and a selection transistor 175.

Here, as the four transistors 172 to 175, N-channel transistors are used, for example. Note that the exemplified combination of the conductivity types of the transfer transistor 172, the reset transistor 173, the amplification transistor 174, and the selection transistor 175 is merely one example. The present disclosure is not limited to this combination. That is, a combination of p-type transistors may alternatively be employed, as needed.

To the pixel circuit included in the pixel load 151, a transfer signal T, a reset signal R, and a selection signal S, which are drive signals for driving the pixel circuit, are supplied from the vertical scanning unit 112 appropriately. Specifically, the transfer signal T is applied to a gate electrode of the transfer transistor 172, the reset signal R is applied to a gate electrode of the reset transistor 173, and the selection signal S is applied to a gate electrode of the selection transistor 175.

The photodiode 171 has an anode electrode connected to a low-potential side power source (for example, a ground). The photodiode 171 performs photoelectric conversion on received light (incident light) to yield a photocharge (here, photoelectron) having a charge amount corresponding to the amount of the received light, and accumulates the photocharge therein. The photodiode 171 has a cathode electrode electrically connected to a gate electrode of the amplification transistor 174 via the transfer transistor 172. A node 176 electrically connected to the gate electrode of the amplification transistor 174 is referred to as a floating diffusion/floating diffusion region (FD) part.

The transfer transistor 172 is connected between the cathode electrode of the photodiode 171 and the FD part 176. To the gate electrode of the transfer transistor 172, a transfer signal T that is active at high level (for example, VDD level) (hereinafter, such a state will be referred to as "High active") is supplied from the vertical scanning unit 112. In response to the transfer signal T, the transfer transistor 172 becomes conductive. Consequently, the transfer transistor 172 transfers, to the FD part 176, the photocharge obtained as a result of the photoelectric conversion performed by the photodiode 171.

The reset transistor 173 has a drain electrode connected to a pixel power source VDD and a source electrode connected to the FD part 176. To the gate electrode of the reset transistor 173, a reset signal R that is High active is supplied from the vertical scanning unit 112. In response to the reset signal R, the reset transistor 173 becomes conductive. Consequently, the reset transistor 173 discards the charge of the FD part 176 to the pixel power source VDD, in order to reset the FD part 176.

The amplification transistor 174 has a gate electrode connected to the FD part 176 and a drain electrode connected to the pixel power source VDD. Also, the amplification transistor 174 outputs, as a reset signal (reset level) Vreset, a potential of the FD part 176 having been reset by the reset transistor 173. The amplification transistor 174 further outputs, as a light accumulation signal (signal level) Vsig, a potential of the FD part 176 to which the signal charge has been transferred from the transfer transistor 172.

The selection transistor 175 has the drain electrode connected to the source electrode of the amplification transistor 174 and the source electrode connected to a respective one of the vertical signal lines, for example. To the gate electrode of the selection transistor 175, a selection signal S that is High active is supplied from the vertical scanning unit 112. In response to the selection signal S, the selection transistor 175 becomes conductive. Consequently, the pixel load 151 is brought into a selected state, and a signal outputted from the amplification transistor 174 is read into the vertical signal line.

As described above, from the pixel circuit included in the pixel load 151, the potential of the FD part 176 having been reset is read out as the reset level Vreset, and then the potential of the FD part 176 to which the signal charge has been transferred is read out as the signal level Vsig. Then, these signals are supplied to the vertical signal line in order. Note that the signal level Vsig also contains a component of the reset level Vreset.

Note that, the circuit configuration described herein includes the selection transistor 175 connected between the source electrode of the amplification transistor 174 and the vertical signal line; alternatively, a circuit configuration including a selection transistor 175 connected between a pixel power source VDD and a drain electrode of an amplification transistor 174 may be employed.

In addition, the pixel circuit included in the pixel load 151 is not limited to the above-described pixel configuration constituted by the four transistors. Alternatively, for example, a pixel configuration constituted by three transistors including an amplification transistor 174 having functions of a selection transistor 175 may be employed. Further alternatively, a pixel configuration in which transistors following a FD part 176 are shared by a plurality of photoelectric conversion elements (pixels) may be employed, for example. Thus, there is no limitation on the configuration of the pixel circuit. Of course, the pixel load 151 includes not only the gate loads of the four transistors but also a wire load.

<Operation According to Conventional Configuration>

Figure 5:
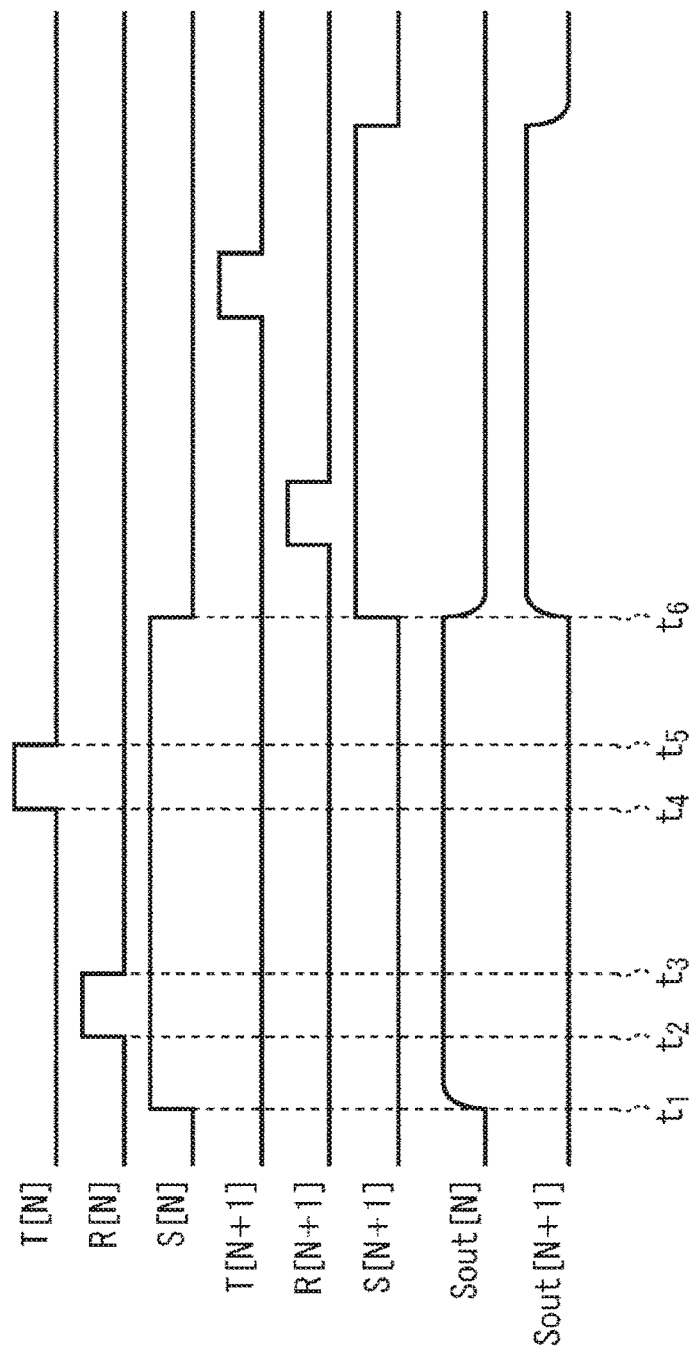
FIG. 5 is a timing chart illustrating operation of the vertical scanning unit and the driver according to the conventional technology.

Next, with reference to a timing chart shown in FIG. 5, the following will describe operation according to the conventional configuration.

Note that FIG. 5 shows, from the top, respective timings of a transfer signal T[N] of an Nth row, a reset signal R[N] of the Nth row, a selection signal S[N] of the Nth row, a transfer signal T[N+1] of an N+1th row, a reset signal R[N+1] of the N+1th row, a selection signal S[N+1] of the N+1th row, a signal output Sout[N] from a driver 141 in the Nth row, and a signal output Sout[N] from a driver 141 in the N+1th row.

Specifically, at a time t1, the selection signal S[N] of the Nth row is caused to be "Hi". Consequently, from this timing, the signal output Sout[N] of the Nth row gradually increases to reach Hi level, and is then supplied to the pixel load 151-1. As a result, a transistor 175 in the Nth row is turned on.

Next, during a period from a time t2 to a time t3, the reset signal R[N] of the Nth row is caused to be at Hi level. Consequently, during this period, the transistor 173 is turned on, so that the FD part 176 is reset.

In addition, during a period from a time t4 to a time t5, the transfer signal T[N] of the Nth row is caused to be at Hi level. Consequently, during this period, a charge is transferred from the photodiode 171 to the FD part 176. Then, the transistor 174 outputs, via the transistors 174 and 175, a pixel signal corresponding to the voltage of the charge accumulated in the FD part 176.

Then, at a time t6, the selection signal S[N] of the Nth row is turned off and the selection signal S[N+1] of the N+1th row is turned on. Then, a subsequent row is selected, and a process described below will be performed repeatedly.

Here, electric power consumed when the state in which the selection signal S[N] is on is transitioned to the state in which the selection signal S[N+1] is on is expressed by "V×(CV/t)". In this formula, C denotes a pixel load, V denotes an amplitude of an output, and t denotes a period of time corresponding to a single cycle.

The signal output Sout[N] and the signal output Sout[N+1] do not interfere with each other. Thus, the electric power expressed by the above formula is consumed.

<Relation Between Vertical Scanning Unit and Pixel Array According to Present Disclosure>

Figure 6:
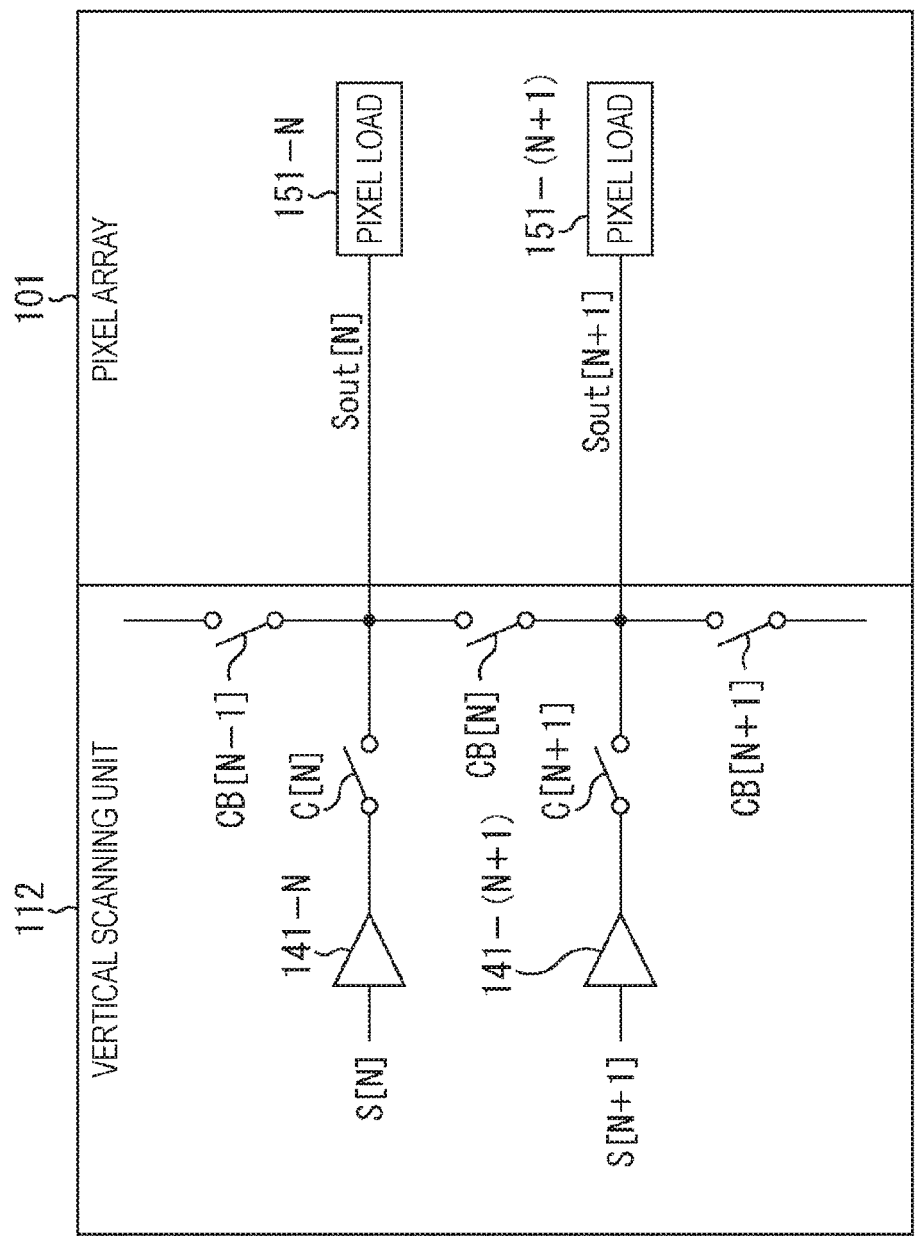
FIG. 6 is a view illustrating an example of a configuration including the vertical scanning unit and the pixel array according to the present disclosure.

Next, with reference to FIG. 6, the following will describe a relation between a vertical scanning unit and a pixel array according to the present disclosure. Note that, for features in the configuration of FIG. 6 having functions identical to those in the configuration of FIG. 2, descriptions thereof are omitted.

Specifically, the configuration of FIG. 6 is different from the configuration of FIG. 2 in that the configuration of FIG. 6 includes a vertical scanning unit 112 including a switch C[N] configured to be turned on or off to bring an output of a driver 141 into a floating state and a switch CB[N] configured to be turned on or off to cause an output of the driver 141 in an Nth row to be connected (short-circuited) to an output of a driver 141 in an N+1th row adjacent to the Nth row.

The switch C[N] and the switch CB[N] are controlled as follows. That is, in the vicinity of each of a rising timing and a falling timing of a selection signal S[N], the switch C[N] is controlled to be turned off, so that the drivers 141 in the Nth row and the N+1th row are brought into a floating state. In addition, at this timing, the switch CB[N] is controlled to be turned on, so that the Nth row and the N+1th row, which are adjacent to each other, are connected (short-circuited) to each other. Consequently, a charge of a signal line of the selection signal S[N], which has been on until then, is transferred to a signal line of a selection signal [N+1], which will be turned on next. As a result, middle (M) level, which is an intermediate level between Hi level and Low level, is attained.

Thereafter, the switch C[N] is controlled to be turned on, so that the floating state is cancelled. Then, the switch CB[N] is controlled to be turned off, and operation similar to the above is performed on the N+1th row. According to this operation, a new selection signal S[N+1] of the N+1th row only needs to be changed from M level to Hi level. Consequently, it is possible to reduce electric power consumption of the driver 141.

<Operation of Configuration According to Present Disclosure>

Figure 7:
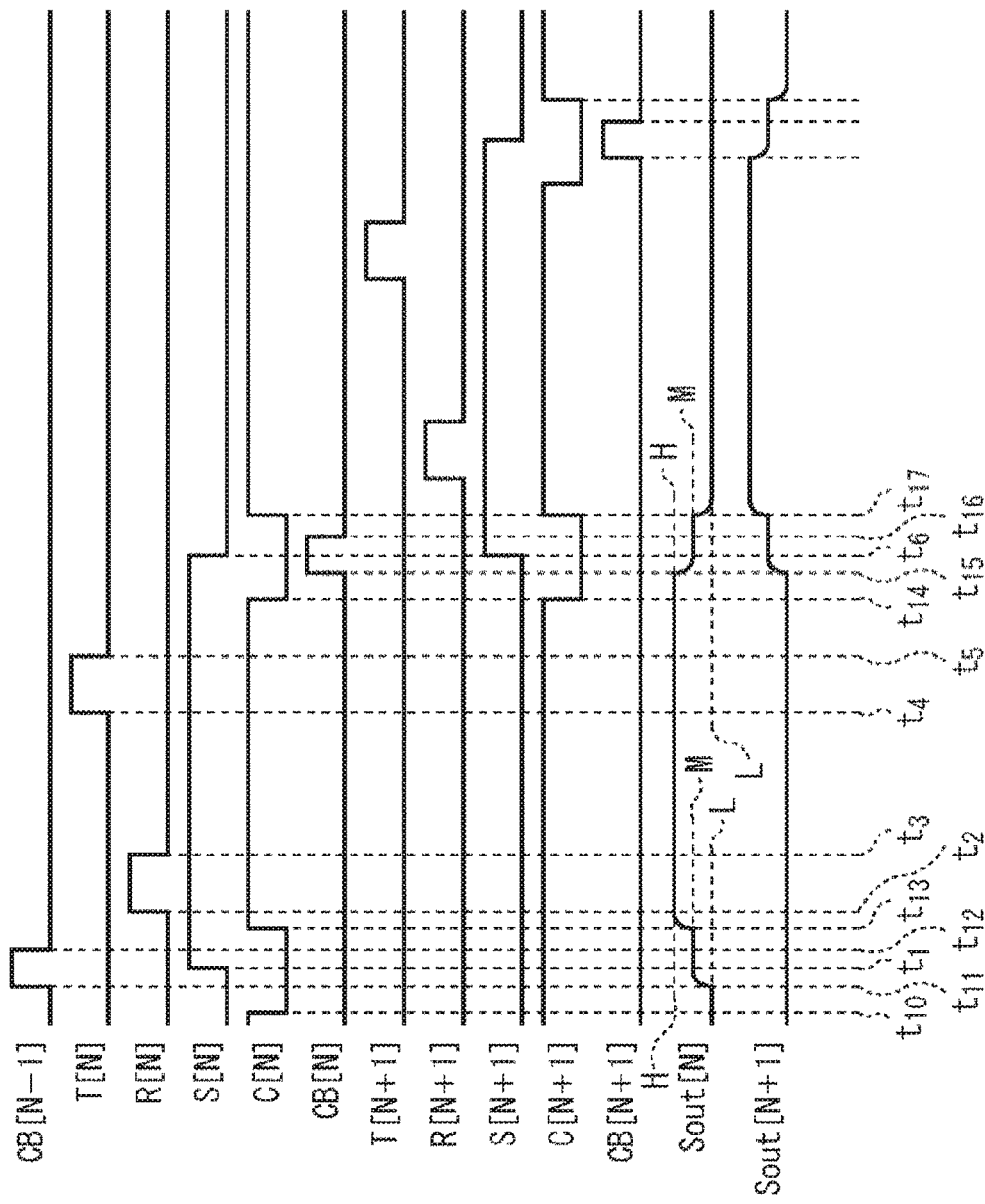
FIG. 7 is a timing chart illustrating operation of the vertical scanning unit and the driver according to the present disclosure.

Next, with reference to a timing chart shown in FIG. 7, the following will describe operation of the configuration of FIG. 6 according to the present disclosure. Note that description of operation in the timing chart of FIG. 7 identical to that in the timing chart of FIG. 5 is omitted. Specifically, the timing chart of FIG. 7 is different from the timing chart of FIG. 5 in that the timing chart of FIG. 7 additionally includes timing charts indicating timings at which the switches CB[N−1], CB[N], CB[N+1], C[N], and C[N+1] are turned on and off.

Specifically, in FIG. 7, during a period from a time t10 to a time t13 including a time t1 at which a selection signal S[N] rises, the switch C[N] is turned off, so that the driver 141 in an Nth row is brought into a floating state. In addition, during a period from a time t11 to a time t12 being within the period from the time t10 to the time t13 in which the driver 141 in the Nth row is brought into a floating state and including the time t1 at which the selection signal S[N] rises, the switch CB[N−1] is turned on. Consequently, a charge of the Nth row and a charge of an output Sout[N−1] of a driver 141 in an N−1th row (not illustrated) are transferred to Sout[N], so that these charges are distributed to each other. As a result, the Hi (H)-level potential of the output of the driver 141 in an (N−1)th row and the Low (L)-level potential of the original output of the driver 141 in the Nth row are each made an intermediate potential (M level).

Consequently, at the time t1, in response to turning-on of the selection signal S[N], the driver 141 in the Nth row can output a signal at Hi level merely by increasing the signal level from M level to Hi level. Consequently, it is possible to reduce electric power consumption of the driver 141.

Similarly, during a period from a time t14 to a time t17 including a time t6 at which the selection signal S[N] falls and a selection signal S[N+1] rises, the switches C[N] and C[N+1] are turned off, so that the drivers 141 in the Nth row and an N+1th row are brought into a floating state. In addition, during a period from a time t15 to a time t16 being within the period from the time t14 to the time t17 in which the drivers 141 in the Nth row and the N+1th row are brought into a floating state and including the time t6 at which the selection signal S[N] falls and the selection signal S[N+1] rises, the switch CB[N] is turned on. Consequently, the charge of the Nth row and a charge of an output Sout[N] of the driver 141 in the N+1th row (not illustrated) are transferred to Sout[N+1], so that these charges are distributed to each other. As a result, the Hi (H)-level potential of the output of the driver 141 in the Nth row and the Low (L)-level potential of the original output of the driver 141 in the N+1th row are each made an intermediate potential (M level).

Consequently, also at the time t6, in response to turning-on of the selection signal S[N+1], the driver 141 in the N+1th row can output a signal at Hi level merely by increasing the signal level from M level to Hi level. Consequently, it is possible to reduce electric power consumption of the driver 141.

More specifically, at each of the time t1 and the time t6, electric power supplied by the driver 141 is expressed by "V×(C(V/2)/t)". That is, an amplitude for charging (charging voltage) is reduced by half. Thus, it is possible to reduce electric power consumption by half.

Note that the rising timing of the selection signal S[N] may be any timing, as long as the rising timing is after the switch C[N] has fallen to be off, that is, after the selection signal C[N] is turned off. Furthermore, the rising timing of the selection signal S[N] may be before or after the switch C[N] has risen to be on.

Meanwhile, the switch CB[N] may be turned on or off at any timing, as long as the timing of the turning-on or -off is within a period in which the switch C[N] is off after falling. In FIG. 7, the switch C[N] rises after the selection signal S[N] has risen, and therefore the signal output Sout[N], which is an output of the driver, changes after the switch C[N] has risen to be on. Similarly, the selection signal S[N] may fall at any timing, as long as the timing of the falling is after the switch C[N] has fallen to be off.

In a case where the selection signal S[N] changes (rises or falls) after the switch C[N] has changed, the signal output Sout[N] changes at a timing at which the selection signal S[N] changes.

<First Modification>

In the example described above, the switch C[N] and the switch CB[N] are provided in the vertical scanning unit 112. Alternatively, the switch C[N] and the switch CB[N] may be provided in the pixel array 101.

Figure 8:
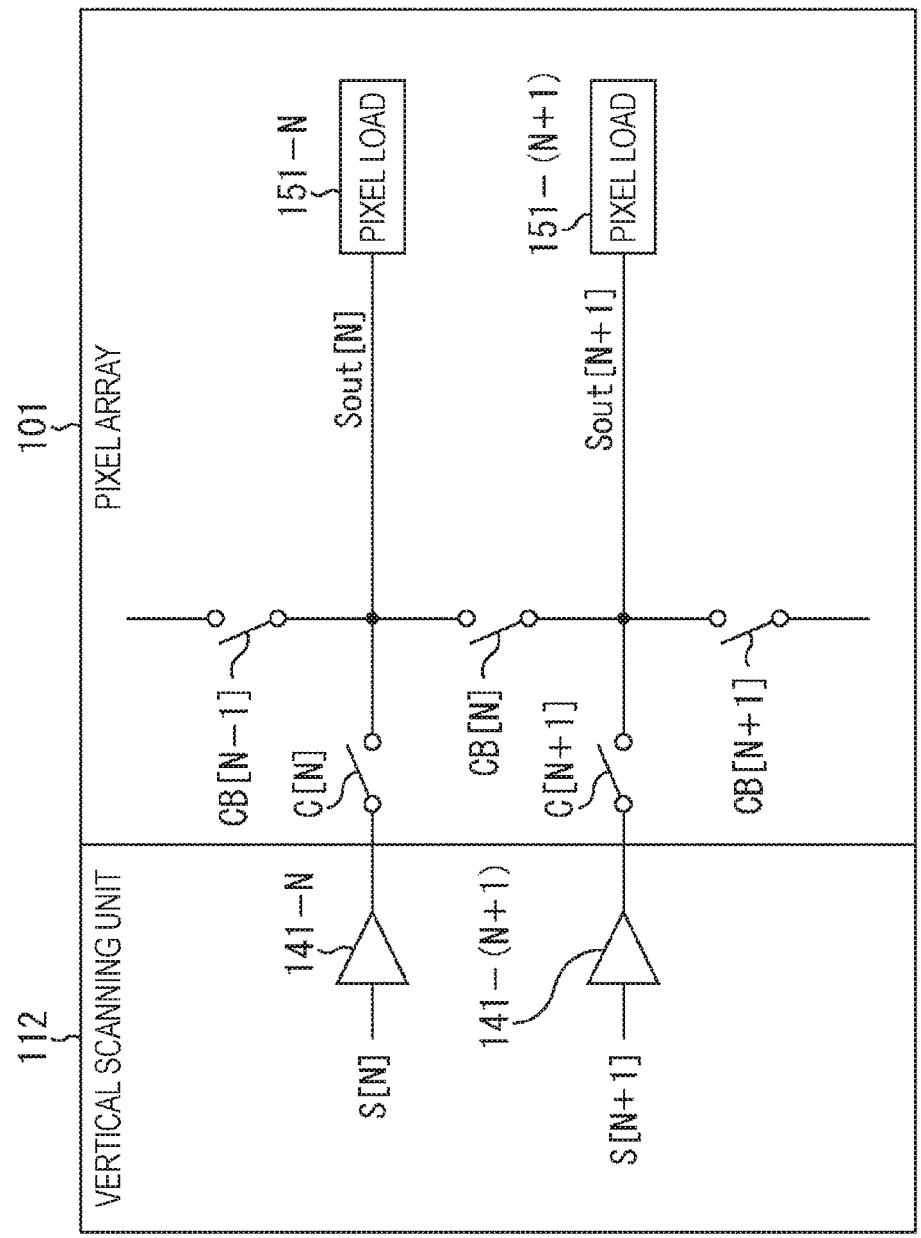
FIG. 8 is a view illustrating a vertical scanning unit and a pixel array according to a first modification of the present disclosure.

Specifically, as illustrated in FIG. 8, a switch C[N] and a switch CB[N] may be provided in a pixel array 101.

In addition, in a case of a solid-state imaging element 11 including a stack in which a pixel chip constituting the pixel array 101 and a circuit chip constituting a circuit including a vertical scanning unit 112 are bonded to each other, the pixel chip may alternatively be referred to as a pixel array 101 side, and the circuit chip may alternatively be referred to as a vertical manipulation unit 112 side. Furthermore, in such a configuration, the switch C[N] and the switch CB[N] may be provided in the pixel chip or in the circuit chip.

Moreover, the switch C[N] and the switch CB[N] may be disposed entirely in the pixel array 101 or in the vertical scanning unit 112. Alternatively, a part of the switch C[N] and the switch CB[N] may be disposed on the pixel array 101 side, and the other part of the switch C[N] and the switch CB[N] may be disposed in the vertical scanning unit 112.

<Second Modification>

In the example described above, the driver 141 outputs a binary signal output Sout[N] corresponding to a selection signal S[N]. In addition to this, a floating state may also be set as an output value according to a state of a signal for controlling the switch C[N]. With such a configuration, the switch C[N] may be omitted.

Figure 9:
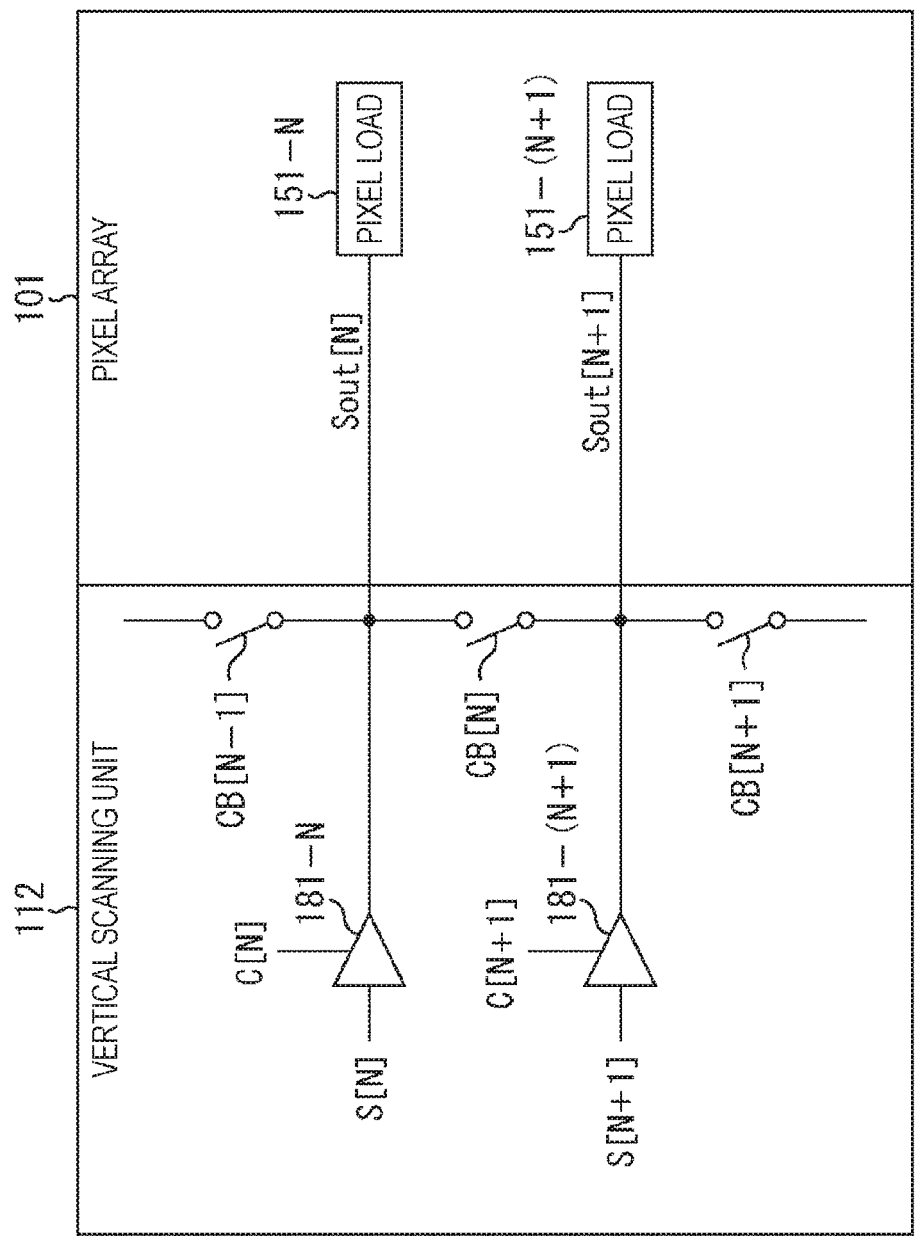
FIG. 9 is a view illustrating a vertical scanning unit and a pixel array according to a second modification of the present disclosure.

Specifically, FIG. 9 illustrates a vertical scanning unit 112 having a configuration including a driver 181 configured such that, in addition to a binary signal output Sout[N] corresponding to a selection signal S[N], a floating state may also be set as an output value according to a state of a signal (in FIG. 9, a control signal C[N]) for controlling a switch C[N]. Note that, for features in the configuration of FIG. 9 having functions identical to those in the configurations of FIGS. 6 and 8, identical names and identical reference signs are given.

Specifically, the driver 181 is capable of switching the level of the signal output Sout[N] between Hi level and Low level according to the selection signal S[N], and is also capable of switching the state of the signal output Sout[N] to a floating state according to the control signal C[N] that is used to control the switch C[N] in FIG. 6 or 8. This eliminates the need for the switch C[N].

<Example of Configuration of Driver of FIG. 9>

Figure 10:
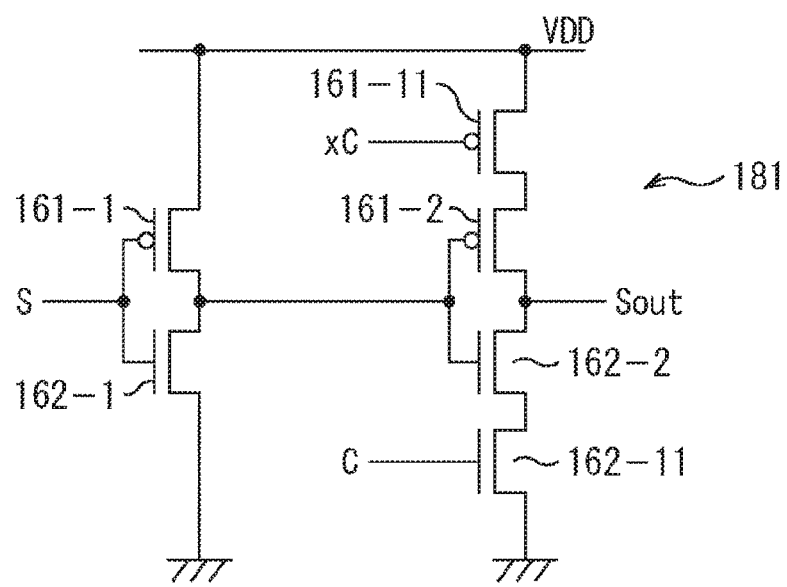
FIG. 10 is a view illustrating an example of a configuration of a driver shown in FIG. 9.

The driver 181 described above has a configuration as those illustrated in FIG. 10, for example. Specifically, the driver 181 of FIG. 10 includes PMOS transistors 161-1 and 161-2 and NMOS transistors 162-1 and 162-2, and further includes transistors 161-11 and 162-11.

More specifically, the driver 181 includes a PMOS transistor 161-11 for accepting the control signal C[N] and an NMOS transistor 162-11 for accepting an inverse control signal xC[N] that is obtained as a result of polarity inversion on the control signal C[N] and is inputted thereto, the polarity inversion being performed by an inverter (not illustrated) at the time when the control signal C[N] is inputted.

In FIG. 10, sources and drains of the transistors 161-11, 161-2, 162-2, and 162-11, which are shown in this order from the top in FIG. 10, are connected in series between a power source VDD and a ground level each shown in a right portion of FIG. 10.

In addition, to a gate of the transistor 162-11, the control signal C[N] having been used to control the switch C[N] is supplied. To a gate of the transistor 161-11, the inverse control signal xC[N] of the control signal C[N] is supplied. Furthermore, to gates of the transistors 161-1 and 162-1, the selection signal S[N] is supplied. From the transistors 161-1 and 162-1, a signal obtained as a result of polarity inversion on the selection signal S[N] is outputted. The signals thus outputted is supplied to gates of the transistors 161-2 and 162-2.

With such a configuration, at the time when the control signal C[N] is set at Hi level, the inverse control signal xC[N] is set at Low level. In addition, the transistor 161-11 is turned on to be at the power supply voltage VDD, and the transistor 162-11 is turned on to be at the ground level. At this time, according to the selection signal S[N], the transistors 161-1 and 162-1 output the signal obtained as a result of polarity inversion on the selection signal S[N]. Furthermore, the transistors 161-2 and 162-2 output a signal obtained as a result of polarity inversion on the inversion signal. That is, the transistors 161-2 and 162-2 output the signal output Sout[N] corresponding to the polarity of the selection signal S[N]. Meanwhile, at the time when the control signal C[N] is set at Low, the inverse control signal xC[N] is set at Hi. In addition, the transistors 161-11 and 162-11 are turned off. Furthermore, Sout[N], which is an output of the transistors 161-2 and 162-2, is brought into a floating state.

Thus, the switch C[N] is not necessary.

<Layout Including Driver and Switch of FIG. 9>

Next, the following will describe a layout of a configuration including the driver 181 and the switch CB[N+1] described above. Here, the switch CB[N+1] includes an NMOS transistor.

Figure 11:
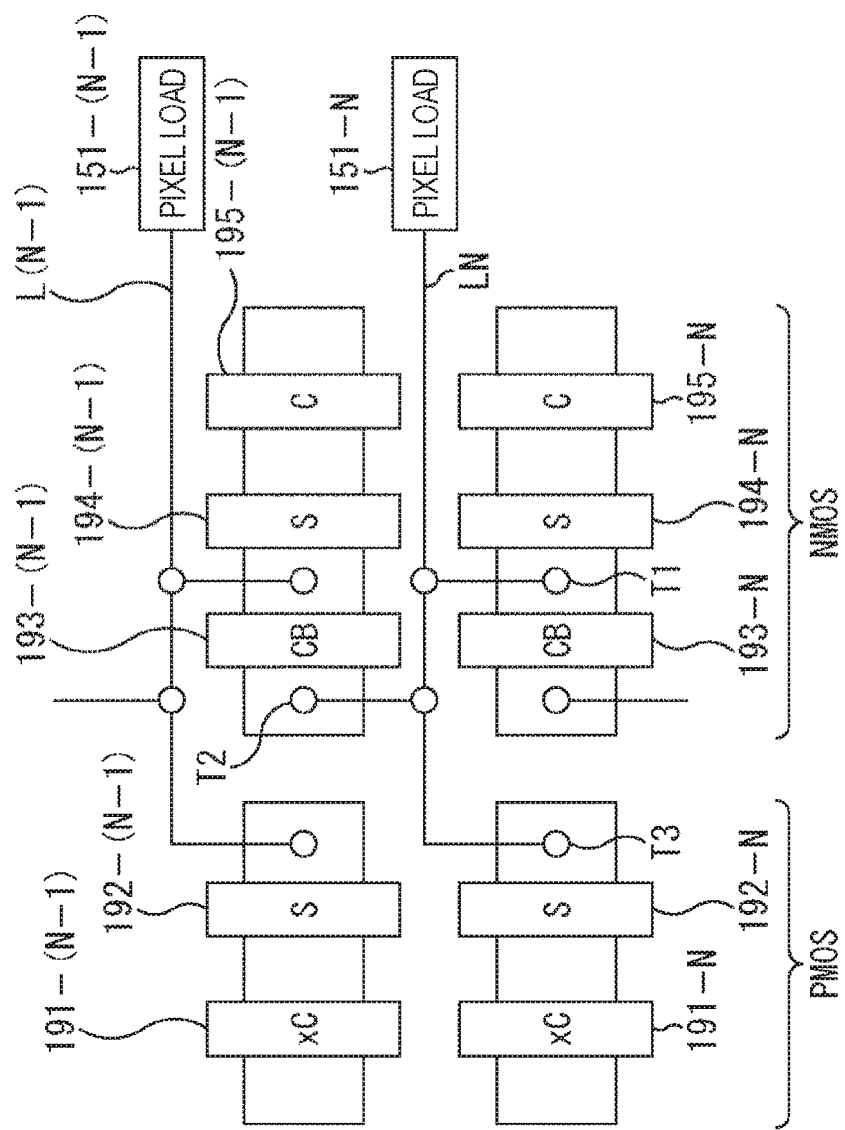
FIG. 11 is a view illustrating an example of a layout of the driver shown in FIG. 10.

Specifically, as illustrated in FIG. 11, in each row, PMOS is disposed on the left side in FIG. 11 and NMOS is disposed on the right side in FIG. 11. In this configuration, a left end of PMOS is connected to a power supply voltage VDD (not illustrated), and a right end of NMOS is at a ground level (not illustrated).

In this state, on a left part of PMOS, gates 191-(N−1) and 191-N for accepting control signals xC[N−1] and xC[N] are disposed. In addition, on the right of the gates 191-(N−1) and 191-N, gates 192-(N−1) and 191-N for accepting selection signals S[N−1] and S[N] are disposed.

Furthermore, on a left part of NMOS, gates 193-(N−1) and 193-N for accepting control signals CB[N−1] and CB[N] for the switches CB[N−1] and CB[N] are disposed. On the right of the gates 193-(N−1) and 193-N, gates 194-(N−1) and 194-N for accepting selection signals S[N−1] and S[N] are disposed. In addition, on the right of the gates 194-(N−1) and 194-N, gates 195-(N−1) and 195-N for accepting control signals C[N−1] and C[N] are disposed.

Moreover, in FIG. 11, a signal line LN extending to a pixel load 151-N is connected to connection parts T3, T1, and T2. The connection part T3 is positioned on the right of the gate 192-N on PMOS (i.e., positioned at a right end of PMOS) of the Nth row. The connection part T1 is interposed between the gates 193-N and 194-N on NMOS of the Nth row. The connection part T2 is positioned on the left of the gate 193 on NMOS (i.e., positioned at a left end of NMOS) of the Nth row.

Specifically, when the gate 193-N is set at Hi level and the switch CB[N] is turned on, a charge of a signal line L(N−1) of the pixel load 151-(N−1) is transferred to the signal line LN extending to the pixel load 151-N, so that the charge is divided. Consequently, the potential of the signal line L(N−1) of the pixel load 151-(N−1) and the potential of the signal line LN extending to the pixel load 151-N become equipotential (intermediate potential) due to charge diffusion. After that, the signal output Sout[N+1] only needs to be increased from the intermediate potential (M level) to Hi level by the driver 181. Consequently, it is possible to reduce electric power consumption.

With the driver 181 of FIG. 10 having such a configuration, the vertical scanning unit 112 of FIG. 9 exerts its functions.

Note that FIG. 11 illustrates an example in which the switch CB[N] includes only NMOS. Alternatively, a switch CB[N] of CMOS type may be employed. Further alternatively, a switch CB[N] including only PMOS may be employed. Still further alternatively, the pattern of the layout configuration may be another configuration that is not the one illustrated in FIG. 11.

<Other Examples of Configuration of Driver of FIG. 9>

The example described above has dealt with the configuration of the driver 181 in which the configuration including the transistors 161-2 and 162-2, which follows the transistors 161-1 and 162-1 configured to control outputting of the signal output Sout[N] according to the control signal S, is interposed between the transistors 161-11 and 162-11 configured to control floating. Alternatively, a configuration in which transistors 161-11 and 162-11 are interposed between transistors 161-2 and 162-2 may be employed.

Figure 12:
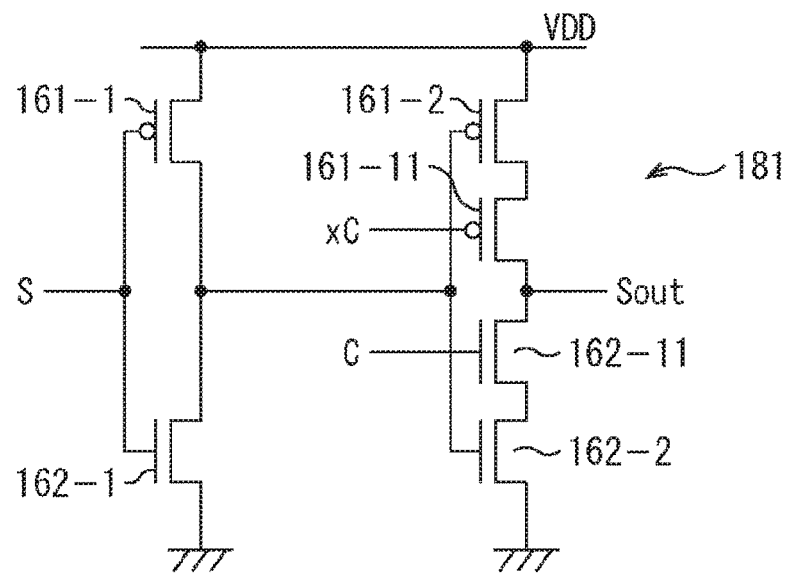
FIG. 12 is a view illustrating another example of a configuration of the driver shown in FIG. 9.

Specifically, as illustrated in FIG. 12, a driver 181 has a configuration in which transistors 161-11 and 162-11 configured to control floating according to control signals C[N] and xC[N] are interposed between transistors 161-2 and 162-2 configured to control a signal output Sout[N] according to a selection signal S[N].

The driver 181 illustrated in FIG. 12 can function in a similar manner to the driver 181 illustrated in FIG. 10.

Note that, although the description above has dealt with the example in which the technology of the present disclosure is applied to the CMOS solid-state imaging element, the technology of the present disclosure may also be applied to a CCD solid-state imaging element. In this case, the CCD solid-state imaging element may be three-phase driving type, two-phase driving type, or four-phase driving type. Especially in the CCD solid-state imaging element, a charge is transferred by the entire chip, and therefore most of electric power is used to drive CCD. Thus, a greater electric power reduction effect can be achieved in a CCD image sensor.

Furthermore, in a case where the number of pixel loads is increased due to an increase in the number of pixels, an increase in the size of the pixel chip, and the like, electric power consumed by the vertical manipulation circuit is increased. Therefore, in such a case, it is possible to achieve an effective reduction in electric power consumption.

Moreover, in the example described above, a charge of one line connected to an output of a driver 141 or 181 in an Nth row to which a selection signal S[N] is supplied is transferred to another line that is adjacent to the one line and is connected (short-circuited) to an output of a driver 141 or 181 in an (N+1)th row to which a selection signal S[N+1] is to be supplied at the next timing, so that the charge is divided to achieve an intermediate potential. However, the signal lines to be short-circuited to each other do not necessarily need to be the signal lines of the rows adjacent to each other. Alternatively, rows apart from each other via some rows may be selected as a row in which read-out is performed first and another row in which read-out is performed next. In this configuration, the one row in which read-out of an output of a driver 141 or 181 is performed and the other row in which read-out of an output of a driver 141 or 181 is performed next may be connected (short-circuited) to each other. Consequently, similar effects can be achieved.

<Applications to Electronic Equipment>

The solid-state imaging element 11 described above is applicable to various types of electronic equipment, for example, imaging devices such as digital still cameras and digital video cameras, mobile phones having an imaging function, and other types of equipment having an imaging function.

Figure 13:
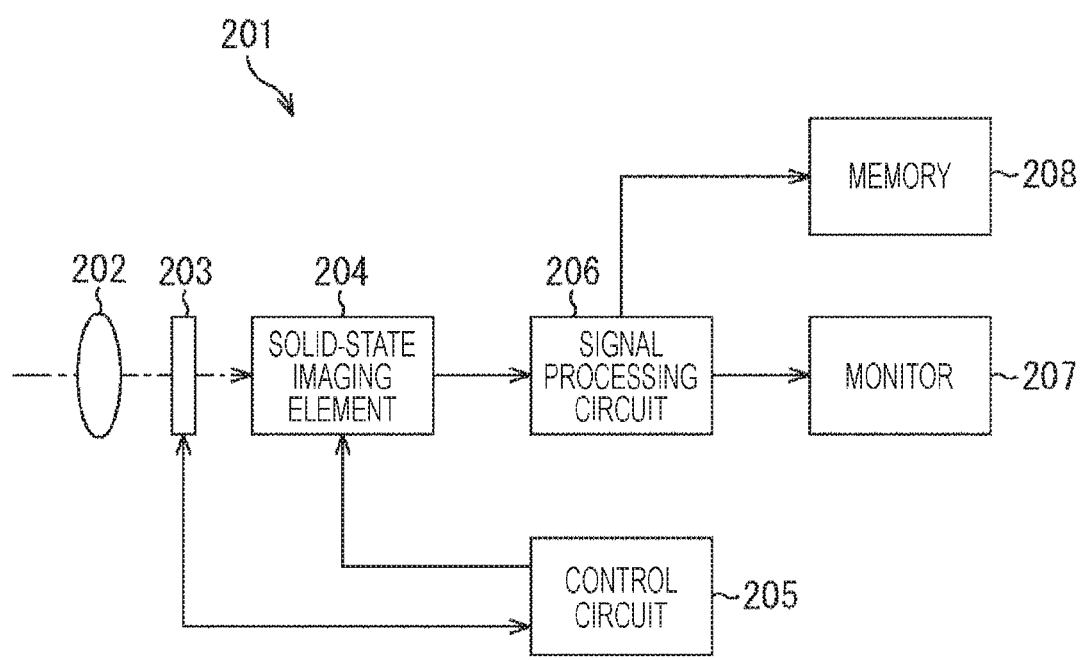
FIG. 13 is a block diagram illustrating an example of a configuration of an imaging device functioning as electronic equipment to which the present technology is applied.

FIG. 13 is a block diagram illustrating an example of a configuration of an imaging device that functions as electronic equipment to which the present technology is applied.

An imaging device 201 illustrated in FIG. 13 includes an optical system 202, a shutter device 203, a solid-state imaging element 204, a drive circuit 205, a signal processing circuit 206, a monitor 207, and a memory 208, and is capable of capturing a still image and a moving image.

The optical system 202 includes a single lens or a plurality of lenses, and guides light (incident light) from a subject to the solid-state imaging element 204 so that an image is formed on a light-receiving surface of the solid-state imaging element 204.

The shutter device 203 is interposed between the optical system 202 and the solid-state imaging element 204. Under control of a drive circuit 1005, the shutter device 203 controls a period of time in which light is emitted to the solid-state imaging element 204 and a period of time in which light to the solid-state imaging element 204 is shielded.

The solid-state imaging element 204 includes a package including the solid-state imaging element described above.

Corresponding to the light from which the image is formed on the light-receiving surface via the optical system 202 and the shutter device 203, the solid-state imaging element 204 accumulates a signal charge therein for a certain period of time. The signal charge accumulated in the solid-state imaging element 204 is transferred according to a drive signal (timing signal) supplied from the drive circuit 205.

The drive circuit 205 outputs a drive signal for controlling transfer operation of the solid-state imaging element 204 and shutter operation of the shutter device 203 to drive the solid-state imaging element 204 and the shutter device 203.

The signal processing circuit 206 performs various kinds of signal processes on the signal charge outputted from the solid-state imaging element 204. As a result of the signal processes performed by the signal processing circuit 206, an image (image data) is obtained, which may be supplied to the monitor 207 and displayed thereon or may be supplied to the memory 208 and stored (recorded) therein.

The imaging device 201 having such a configuration may also employ the solid-state imaging element 11, instead of the above-described solid-state imaging element 204. Consequently, it is possible to achieve a reduction in electric power consumption.

<Examples of Use of Solid-state Imaging Element>

Figure 14:
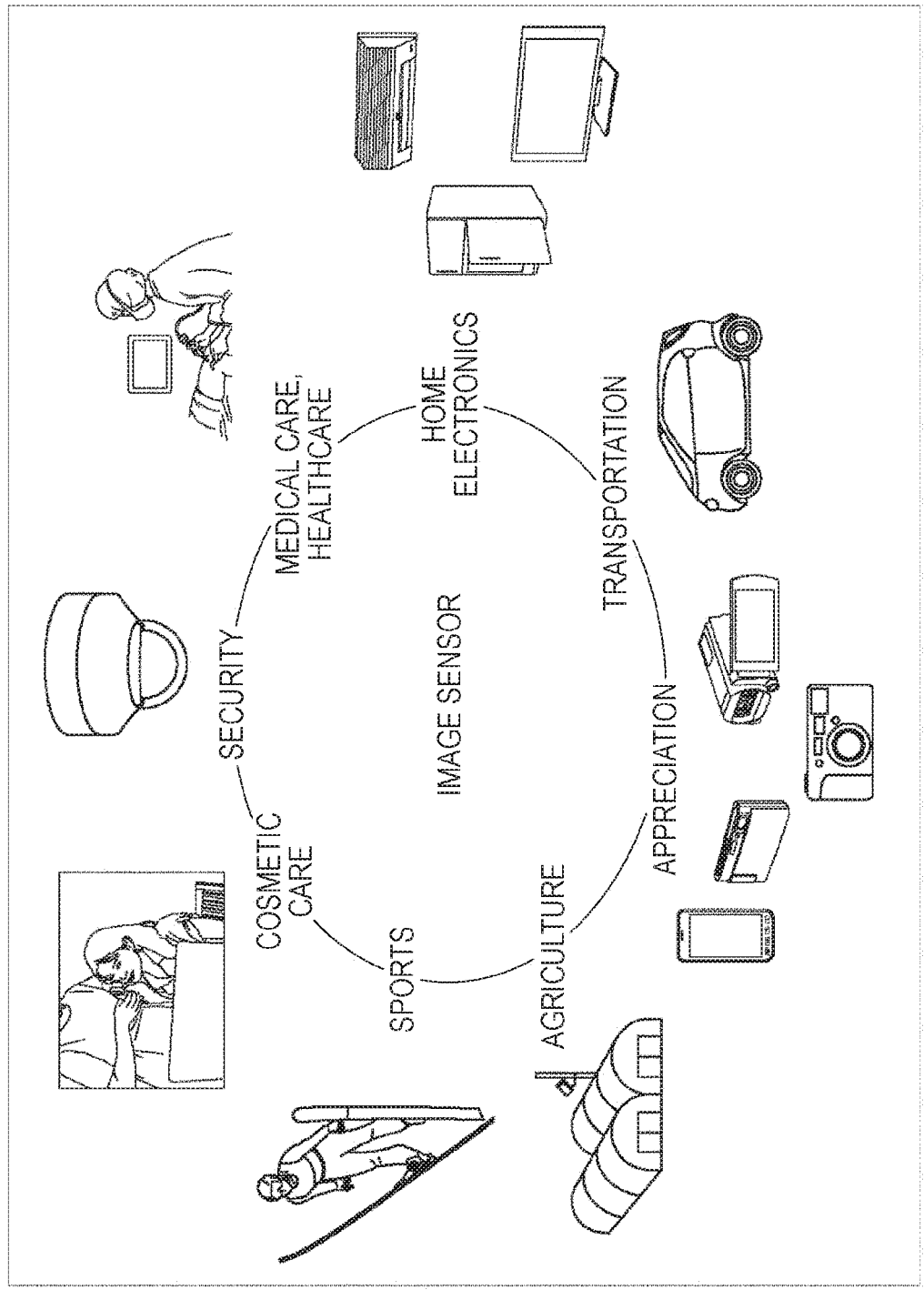
FIG. 14 is a view illustrating examples of use of a solid-state imaging device to which the technology of the present disclosure is applied.

FIG. 14 is a view illustrating examples of use of the solid-state imaging element 11 described above.

For example, the imaging element described above can be used in various cases as described below, such as sensing of light such as visible light, infrared light, ultraviolet light, or X-rays.

- Devices for capturing an image for appreciation, such as digital cameras and mobile devices having a camera function.
- Devices for transportation use, such as on-vehicle sensors for capturing, e.g., an image in front of, behind, around, and/or inside of a vehicle, monitoring cameras for monitoring a traveling vehicle and/or a road, and range sensors for measuring a distance such as an inter-vehicle distance, in order to enable, e.g., automatic stop for safe driving and the like and/or to allow a driver to recognize the circumstances.
- Devices provided in home electronics such as televisions, refrigerators, and air conditioners, the devices capturing an image of a user's gesture to enable operation according to the gesture.
- Devices for medical and/or healthcare use, such as endoscopes and devices for capturing an image of a blood vessel through reception of infrared light.
- Devices for security use, such as monitoring cameras for security and cameras for person authentication.
- Devices for cosmetic use, such as skin sensors for capturing an image of a skin and microscopes for capturing an image of a scalp.
- Devices for sporting use, such as action cameras and wearable cameras for sporting use and the like.
- Devices for agricultural use, such as cameras for monitoring a state of a field and/or a crop.

Note that the present disclosure may also employ the following configurations.

<1> A solid-state imaging element including:
a driver configured to output, with respect to a respective row of a pixel array, a control signal for causing a pixel signal to be transferred in a vertical direction;
a floating setting unit configured to set an output of the driver to a floating state; and
a short-circuit setting unit configured to set, among control signal lines for causing respective control signals to be transmitted with respect to respective rows of the pixel array, a control signal line of an Nth row and a control signal line of an Mth row to a short-circuited state.

<2> The solid-state imaging element of <1>, in which
the driver outputs a control signal to the control signal line of the Nth row and then outputs the control signal to the control signal line of the Mth row, each of the control signals causing the pixel signal to be transferred in the vertical direction, and
during a predetermined period including a timing at which the control signal of the Nth row is switched over to the control signal of the Mth row, the short-circuit setting unit sets, among the control signal lines for causing the respective control signals to be transmitted with respect to the respective rows of the pixel array, the control signal line of the Nth row and the control signal line of the Mth row to the short-circuited state.

<3> The solid-state imaging element described in <2>, in which
the Mth row is an (N+1)th row,
the driver outputs the control signal to the control signal line of the Nth row and then outputs the control signal to a control signal line of the (N+1)th row, each of the control signals causing the pixel signal to be transferred in the vertical direction, and
during a predetermined period including a timing at which the control signal of the Nth row is switched over to the control signal of the (N+1)th row, the short-circuit setting unit sets, among the control signal lines for causing the respective control signals to be transmitted with respect to the respective rows of the pixel array, the control signal line of the Nth row and the control signal line of the (N+1)th row to the short-circuited state.

<4> The solid-state imaging element described in <3>, in which
during a period in which the floating setting unit sets an output of the driver of the control signal line of the (N+1)th row to the floating state, the short-circuit setting unit sets, among the control signal lines for causing the respective control signals to be transmitted with respect to the respective rows of the pixel array, the control signal line of the Nth row and the control signal line of the (N+1)th row to the short-circuited state.

<5> The solid-state imaging element described in any one of <1> to <4>, in which
the floating setting unit is a switch for performing switchover to select whether or not to bring the output of the driver into the floating state, and
the short-circuit setting unit is a switch for performing switchover to select whether or not to bring, among the control signal lines for causing the respective control signals to be transmitted with respect to the respective rows of the pixel array, the control signal line of the Nth row and the control signal line of the Mth row to the short-circuited state.

<6> The solid-state imaging element described in any one of <1> to <5>, in which
the driver includes the floating setting unit to set to any of states of, a first state in which the output of the driver is not in the floating state and the control signal for causing the pixel signal to be transferred in the vertical direction is outputted, a second state in which the control signal is not outputted, and a third state in which the output of the driver is in the floating state.

<7> The solid-state imaging element described in any one of <1> to <6>, in which
the floating setting unit and the short-circuit setting unit are provided on a pixel chip.

<8> The solid-state imaging element described in any one of <1> to <7>, in which
the floating setting unit and the short-circuit setting unit are provided on a circuit chip.

<9> The solid-state imaging element described in any one of <1> to <8>, in which
the floating setting unit and the short-circuit setting unit are dispersedly provided on a pixel chip and a circuit chip.

<10> An imaging device including:
a driver configured to output, with respect to a respective row of a pixel array, a control signal for causing a pixel signal to be transferred in a vertical direction;
a floating setting unit configured to set an output of the driver to a floating state; and
a short-circuit setting unit configured to set, among control signal lines for causing respective control signals to be transmitted with respect to respective rows of the pixel array, a control signal line of an Nth row and a control signal line of an Mth row to a short-circuited state.

<11> Electronic equipment including:
a driver configured to output, with respect to a respective row of a pixel array, a control signal for causing a pixel signal to be transferred in a vertical direction;
a floating setting unit configured to set an output of the driver to a floating state; and
a short-circuit setting unit configured to set, among control signal lines for causing respective control signals to be transmitted with respect to respective rows of the pixel array, a control signal line of an Nth row and a control signal line of an Mth row to a short-circuited state.

<12> A method for operating a solid-state imaging element, the solid-state imaging element including:
a driver configured to output, with respect to a respective row of a pixel array, a control signal for causing a pixel signal to be transferred in a vertical direction;
a floating setting unit configured to set an output of the driver to a floating state; and
a short-circuit setting unit configured to set, among control signal lines for causing respective control signals to be transmitted with respect to respective rows of the pixel array, a control signal line of an Nth row and a control signal line of an Mth row to a short-circuited state,
the method including:
outputting, by the driver, a control signal to the control signal line of the Nth row and then outputting, by the driver, a control signal to the control signal line of the Mth row, each of the control signals causing the pixel signal to be transferred in the vertical direction; and
during a predetermined period including a timing at which the control signal of the Nth row is switched over to the control signal of the Mth row, setting, by the short-circuit setting unit, among the control signal lines for causing the respective control signals to be transmitted with respect to the respective rows of the pixel array, the control signal line of the Nth row and the control signal line of the Mth row to the short-circuited state.

<13> The method for operating a solid-state imaging element described in <12>, in which
the Mth row is an (N+1)th row, the driver outputs the control signal to the control signal line of the Nth row and then outputs the control signal to a control signal line of the (N+1)th row, each of the control signals causing the pixel signal to be transferred in the vertical direction, and during a predetermined period including a timing at which the control signal of the Nth row is switched over to the control signal of the (N+1)th row, the short-circuit setting unit sets, among the control signal lines for causing the respective control signals to be transmitted with respect to the respective rows of the pixel array, the control signal line of the Nth row and the control signal line of the (N+1)th row to the short-circuited state.

<14> The method for operating a solid-state imaging element described in <13>, in which
during a period in which the floating setting unit sets an output of the driver of the control signal line of the (N+1)th row to a floating state, the short-circuit setting unit sets, among the control signal lines for causing the respective control signals to be transmitted with respect to the respective rows of the pixel array, the control signal line of the Nth row and the control signal line of the (N+1)th row to the short-circuited state.

REFERENCE SIGNS LIST

11 Solid-state imaging element
101 Pixel array
112 Vertical scanning unit
141, 141-N, 141-(N+1) Driver
151, 151-N, 151-(N+1) Pixel load
161, 161-1, 161-2, 162, 162-1, 162-2, 162-3 Transistor
181, 181-N, 181-(N+1) Driver
191, 191-N to 195-N, 191-(N+1) to 195-(N+1) Gate

The invention claimed is:

1. A solid-state imaging element comprising:
a driver configured to output, with respect to a respective row of a pixel array, a control signal for causing a pixel signal to be transferred in a vertical direction;
a floating setting unit configured to set an output of the driver to a floating state; and
a short-circuit setting unit configured to set, among control signal lines for causing respective control signals to be transmitted with respect to respective rows of the pixel array, a control signal line of an Nth row and a control signal line of an Mth row to a short-circuited state.

2. The solid-state imaging element according to claim 1, wherein
the driver outputs the control signal to the control signal line of the Nth row and then outputs the control signal to the control signal line of the Mth row, each of the control signals causing the pixel signal to be transferred in the vertical direction, and
during a predetermined period including a timing at which the control signal of the Nth row is switched over to the control signal of the Mth row, the short-circuit setting unit sets, among the control signal lines for causing the respective control signals to be transmitted with respect to the respective rows of the pixel array, the control signal line of the Nth row and the control signal line of the Mth row to the short-circuited state.

3. The solid-state imaging element according to claim 2, wherein
the Mth row is an (N+1)th row,
the driver outputs the control signal to the control signal line of the Nth row and then outputs the control signal to a control signal line of the (N+1)th row, each of the control signals causing the pixel signal to be transferred in the vertical direction, and
during a predetermined period including a timing at which the control signal of the Nth row is switched over to the control signal of the (N+1)th row, the short-circuit setting unit sets, among the control signal lines for causing the respective control signals to be transmitted with respect to the respective rows of the pixel array, the control signal line of the Nth row and the control signal line of the (N+1)th row to the short-circuited state.

4. The solid-state imaging element according to claim 3, wherein during a period in which the floating setting unit sets an output of the driver of the control signal line of the (N+1)th row to the floating state, the short-circuit setting unit sets, among the control signal lines for causing the respective control signals to be transmitted with respect to the respective rows of the pixel array, the control signal line of the Nth row and the control signal line of the (N+1)th row to the short-circuited state.

5. The solid-state imaging element according to claim 1, wherein the floating setting unit is a switch for performing switchover to select whether or not to bring the output of the driver into the floating state, and the short-circuit setting unit is a switch for performing switchover to select whether or not to bring, among the control signal lines for causing the respective control signals to be transmitted with respect to the respective rows of the pixel array, the control signal line of the Nth row and the control signal line of the Mth row to the short-circuited state.

6. The solid-state imaging element according to claim 1, wherein the driver includes the floating setting unit to set to any of states of, a first state in which the output of the driver is not in the floating state and the control signal for causing the pixel signal to be transferred in the vertical direction is outputted, a second state in which the control signal is not outputted, and a third state in which the output of the driver is in the floating state.

7. The solid-state imaging element according to claim 1, wherein the floating setting unit and the short-circuit setting unit are provided on a pixel chip.

8. The solid-state imaging element according to claim 1, wherein the floating setting unit and the short-circuit setting unit are provided on a circuit chip.

9. The solid-state imaging element according to claim 1, wherein the floating setting unit and the short-circuit setting unit are dispersedly provided on a pixel chip and a circuit chip.

10. An imaging device comprising:

a driver configured to output, with respect to a respective row of a pixel array, a control signal for causing a pixel signal to be transferred in a vertical direction;

a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state.

11. Electronic equipment comprising:

a driver configured to output, with respect to a respective row of a pixel array, a control signal for causing a pixel signal to be transferred in a vertical direction;

a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state.

12. A method for operating a solid-state imaging element, the solid-state imaging element including:

a driver configured to output, with respect to a respective row of a pixel array, a control signal for causing a pixel signal to be transferred in a vertical direction;

a floating setting unit configured to set an output of the driver to a floating state; and a short-circuit setting unit configured to set, among control signal lines for causing respective control signals to be transmitted with respect to respective rows of the pixel array, a control signal line of an Nth row and a control signal line of an Mth row to a short-circuited state, the method comprising:

outputting, by the driver, the control signal to the control signal line of the Nth row and then outputting, by the driver, the control signal to the control signal line of the Mth row, each of the control signals causing the pixel signal to be transferred in the vertical direction; and during a predetermined period including a timing at which the control signal of the Nth row is switched over to the control signal of the Mth row, setting, by the short-circuit setting unit, among the control signal lines for causing the respective control signals to be transmitted with respect to the respective rows of the pixel array, the control signal line of the Nth row and the control signal line of the Mth row to the short-circuited state.

13. The method for operating the solid-state imaging element according to claim 12, wherein the Mth row is an (N+1)th row, the driver outputs the control signal to the control signal line of the Nth row and then outputs the control signal to a control signal line of the (N+1)th row, each of the control signals causing the pixel signal to be transferred in the vertical direction, and during a predetermined period including a timing at which the control signal of the Nth row is switched over to the control signal of the (N+1)th row, the short-circuit setting unit sets, among the control signal lines for causing the respective control signals to be transmitted with respect to the respective rows of the pixel array, the control signal line of the Nth row and the control signal line of the (N+1)th row to the short-circuited state.

14. The method for operating the solid-state imaging element according to claim 13, wherein during a period in which the floating setting unit sets an output of the driver of the control signal line of the (N+1)th row to the floating state, the short-circuit setting unit sets, among the control signal lines for causing the respective control signals to be transmitted with respect to the respective rows of the pixel array, the control signal line of the Nth row and the control signal line of the (N+1)th row to the short-circuited state.

* * * * *